(12) United States Patent
Anderson

(10) Patent No.: US 7,657,022 B2
(45) Date of Patent: *Feb. 2, 2010

(54) METHOD AND SYSTEM FOR PERFORMING AUTOMATED TELEMARKETING

(75) Inventor: David J. Anderson, Lawrenceville, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/845,909

(22) Filed: Aug. 28, 2007

(65) Prior Publication Data

US 2007/0291926 A1    Dec. 20, 2007

Related U.S. Application Data

(63) Continuation of application No. 10/441,465, filed on May 20, 2003, now Pat. No. 7,280,651.

(51) Int. Cl.
*H04M 3/523* (2006.01)
*H04M 11/00* (2006.01)

(52) U.S. Cl. ............................... 379/266.07; 379/88.14

(58) Field of Classification Search ................... 379/40, 379/51, 88.01–88.06, 88.13, 88.14, 100.14, 379/212.01, 266.07, 266.08

See application file for complete search history.

(56) References Cited

U.S. PATENT DOCUMENTS

| | | | |
|---|---|---|---|
| 5,341,412 A | | 8/1994 | Ramot et al. |
| 5,444,774 A | * | 8/1995 | Friedes ................. 379/266.01 |
| 5,822,400 A | | 10/1998 | Smith |
| 5,878,423 A | | 3/1999 | Anderson et al. |
| 5,889,799 A | | 3/1999 | Grossman et al. |
| 5,963,635 A | | 10/1999 | Szlam et al. |
| 5,991,395 A | | 11/1999 | Miloslavsky |
| 6,457,177 B1 | | 9/2002 | Reams |
| 6,771,746 B2 | | 8/2004 | Shambaugh et al. |
| 6,791,586 B2 | | 9/2004 | Baker |
| 6,804,346 B1 | | 10/2004 | Mewhinney |
| 6,850,602 B1 | | 2/2005 | Chou |
| 7,062,019 B2 | | 6/2006 | Krack |
| 7,103,173 B2 | | 9/2006 | Rodenbusch et al. |
| 7,280,651 B2 | * | 10/2007 | Anderson .............. 379/266.07 |
| 7,372,947 B1 | * | 5/2008 | Messmer ................. 379/88.01 |
| 2002/0169600 A1 | | 11/2002 | Busayapongchai et al. |
| 2002/0184042 A1 | | 12/2002 | Hommrich et al. |
| 2003/0061039 A1 | | 3/2003 | Levin |

* cited by examiner

*Primary Examiner*—Harry S Hong
(74) *Attorney, Agent, or Firm*—Cantor Colburn L.L.P.

(57) ABSTRACT

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

18 Claims, 4 Drawing Sheets

FIG. 3

302 — Zip code
304 — Candidates
    Candidate 1
    Candidate 2
306 — Office
308 — Election date
310 {
    Issue 1
       Candidate 1 stand
       Candidate 2 stand
    Issue 2
       Candidate 1 stand
       Candidate 2 stand
    .
    .
    .
    Issue N
       Candidate 1 stand
       Candidate 2 stand
312 — Comments

METHOD AND SYSTEM FOR PERFORMING AUTOMATED TELEMARKETING

CROSS-REFERENCE TO RELATED APPLICATIONS

This application is a continuation of U.S. patent application Ser. No. 10/441,465 filed May 20, 2003, the contents of which are incorporated by reference herein in their entirety.

BACKGROUND OF THE INVENTION

The present disclosure relates generally to a method for performing automated telemarketing and in particular, to a method for utilizing an interactive speech application located on a voice platform to initiate and execute telemarketing telephone calls and dynamic dialog call-backs to potential customers.

Computer-based interactive speech applications are widely used in telephone systems to answer incoming calls as well as to perform various tasks including gathering information from callers, providing information to callers, and connecting callers with appropriate parties. Typically, the call flow is activated when the system receives an incoming call, and begins with a system-generated greeting followed, if needed, by a list of available options. The application waits for a response from the caller and processes the response when received. The application must be able to recognize what the caller said in order to determine what should happen next. The application performs this determination by converting the caller's speech into a text of distinct words (speech recognition); analyzing the recognized words grammatically and then systematically representing its meaning (natural language understanding); obtaining targeted data based on that meaning's representation from an appropriate online source (information retrieval); building a text sentence that presents the retrieved data in the user's preferred language (language generation); and converting that text sentence into computer-generated speech (speech synthesis or text-to-speech conversion).

As interactive speech application technology continually improves, applications for utilizing speech recognition for information retrieval systems are becoming a more popular resource for consumers. As an example, "Info-by-Voice for Atlanta" was an automated, voice-operated telephone portal that was available to consumers in the metropolitan area surrounding Atlanta, Georgia who wished to obtain directory assistance information concerning topics such as restaurants, traffic information, stock quotes, weather, sports and business news. By using this service, a caller provided information in response to a series of questions from a pre-recorded voice, and then received a list of names and contact information for businesses matching the desired criteria. For example, if a caller submitted a request for Chinese restaurants, the system might have identified five places for the caller to consider. In this manner, an audio information retrieval directory can provide a useful and convenient resource for local and topical information.

Telemarketing operations currently employ automatic dialing equipment that can dial a phone number, detect an off-hook answer, determine if the off-hook condition is "live" (vs. an answering machine) and then deliver a prerecorded message or connect the called party to a telemarketer. Typically, the called party understands that the silence on the line prior to the connection to the message or telemarketer means that the call is from a telemarketer. Because of this, the called party often hangs up the phone before the telemarketer gets on the line or before the prerecorded message is played. In many cases, answering machines with brief greetings may trigger the connection so that the telemarketer hears the recorded message on the answering machine. This can lead to wasted time for the telemarketer. Further, telemarketing is labor intensive and is utilized for both basic and complex product/service calls.

In addition, customer service operations typically involve having a service representative physically calling or returning a call to a customer with basic information, perhaps about a service appointment, notification, update or confirmation. This process is labor intensive and requires that a service representative is available to make the telephone calls when the customer is available.

BRIEF DESCRIPTION OF THE INVENTION

One aspect is a method for performing automated telemarketing. The method includes receiving potential customer data including a telephone number, and initiating a telephone call to the telephone number using an auto-dialing technology. The method also includes receiving notification that the potential customer has answered the telephone call, sending a verbal greeting to the potential customer in response to receiving the notification, and conversing with the potential customer. The conversing includes accessing a plurality of questions and scripted answers from a telemarketing database. The conversing further includes reciting the questions and scripted answers selectively in response to a message received from the potential customer, where the message is interpreted by a speech recognition technology. The conversing may employ a text-to-speech technology and/or visual data.

Another aspect is a computer program product for performing automated telemarketing. The computer program product includes a storage medium readable by a processing circuit and storing instructions for execution by the processing circuit for performing a method. The method includes receiving potential customer data including a telephone number, and initiating a telephone call to the telephone number using an auto-dialing technology. The method further includes receiving notification that the potential customer has answered the telephone call, sending a verbal greeting to the potential customer in response to receiving the notification, and conversing with the potential customer. The conversing includes accessing a plurality of questions, scripted answers, and information from a telemarketing database. The conversing also includes outputting the questions, scripted answers, and information selectively in response to a message received from the potential customer, where the message is interpreted by a speech recognition technology. The conversing may employ a text-to-speech technology and/or visual data.

In another aspect, a system for performing automated telemarketing is provided. The system includes a platform in communication with a data center and a call center via a network, the platform including an auto-dialing technology and a text-to-speech technology in communication with the network. The platform further includes instructions to implement a method. The method includes receiving potential customer data from the data center via the network including a telephone number, and initiating a telephone call via the network to the telephone number using the auto-dialing technology. The method also includes sending a verbal greeting via the network to the potential customer, where the greeting is provided by the text-to-speech technology. The method additionally includes transferring the telephone call to the call center via the network in response to a message from the potential customer, and transmitting telephone call data to a database in response to the transferring.

BRIEF DESCRIPTION OF THE DRAWINGS

Referring to the exemplary drawings wherein like elements are numbered alike in the several FIGURES:

FIG. 3 is a database layout of an exemplary telemarketing application database utilized by an embodiment of the present invention.

DETAILED DESCRIPTION OF THE INVENTION

An exemplary embodiment of the present invention utilizes auto-dialing and/or out dialing equipment empowered with an automated interactive speech enabled voice application to deliver a conversational dialog to a potential customer. This conversational voice application greets and engages the called party, pealing their interest and inviting their participation in a business message or promotion. The speech technology, involving speech recognition and natural language understanding methods, permits a dynamic conversation with the called party that determines the interests of the called party and then tailors the conversation to the messages heard from the called party. In this approach, the called party, a potential customer, is more likely to give the calling service an opportunity to deliver a message and to listen to related offers. Additional information may be pulled from a central database to assist in the conversation. A transfer to a customer service representative is also possible if desired or needed at any time during the call. By engaging the called party, outbound dialing resources are more productive and the number of successful marketing calls increase. For example, if the called party indicates they are not interested, the call ends and the calling platform's port is reapplied to a new call. Called parties that show interest can hear a message that fits their needs based on their responses to qualifying questions. This may lead to the ability to quickly strike an interest with the called party and make the "cold call" a "desired" call.

Figure 1:
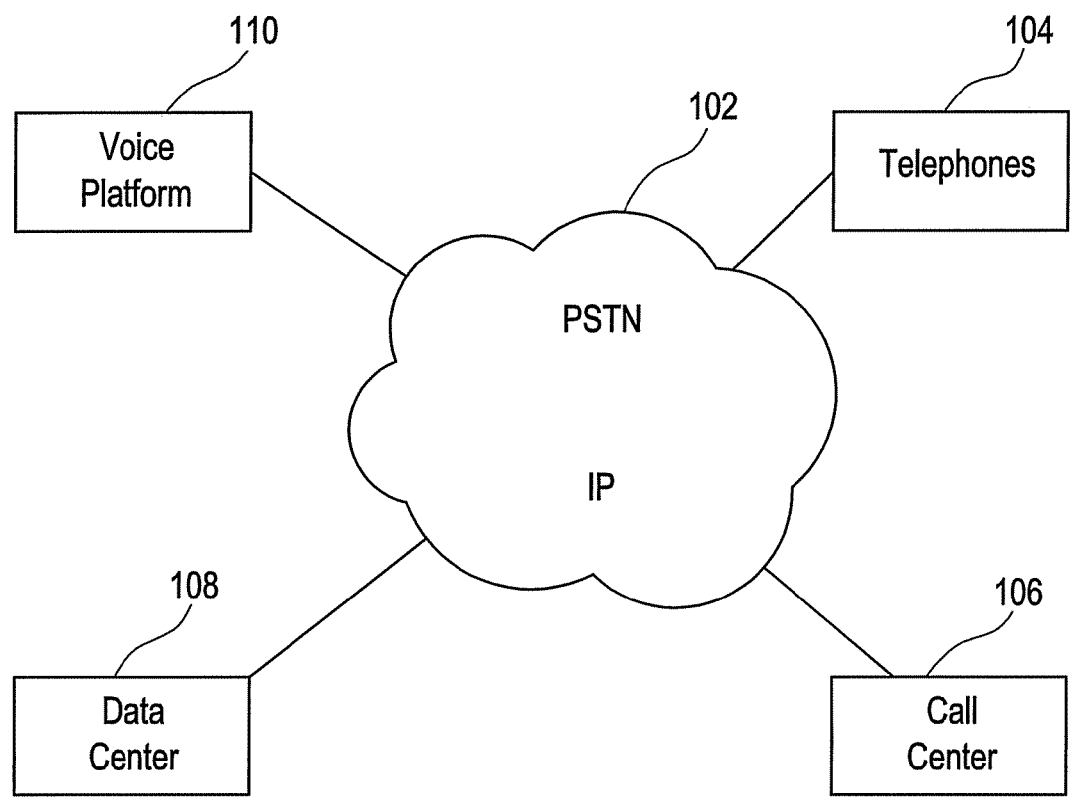
FIG. 1 is a block diagram of an exemplary system for performing telemarketing utilizing an exemplary embodiment of the present invention.

FIG. 1 is a block diagram of an exemplary system for performing telemarketing. The exemplary system includes a voice platform 110, a data center 108, telephones 104 and a call center 106, with related equipment and service representatives, all connected to a network 102. Telephone calls to potential customers located at the telephones 104 are generated by auto-dialing equipment included in the voice platform 110. Data relevant to each telephone call is retrieved as needed from one or more databases located on the voice platform 110 and/or at the data center 108. If interest exists, or more information is requested, the called party may be connected to the appropriate call center 106 for follow-up with a customer service representative. This connection to a call center 106 may be performed by bridging at the voice platform or through redirection in the network 102.

The network 102 may be any type of known network including, but not limited to, a public switched telephone network (PSTN), a wide area network (WAN), a local area network (LAN), a global network (e.g. Internet), a voice over Internet protocol (VOIP), a virtual private network (VPN), and an intranet. The network 102 may be implemented using a wireless network or any kind of physical network implementation known in the art. One or more of the voice platform 110, the telephones 104, the data center 108 and the call center 106 may be connected to the network 102 in a wireless fashion. In addition, one or more of the voice platform 110, the data center 108 and the call center 106 may be physically located in the same geographic location or they may be at three different geographic locations as depicted in FIG. 1. In an exemplary embodiment of the present invention, a PSTN is utilized to provide communication between the voice platform 110, the telephones 104 and the call center 106; and the Internet is utilized to provide communication between the voice platform 110, the data center 108 and the call center 106.

The voice platform 110 is the foundation on which the telemarketing voice application is developed and deployed. It executes the commands and logic specified by the respective telemarketing voice application, provides the speech processing capabilities (e.g., speech recognition, text-to-speech), interfaces to databases at the data center 108, interfaces to the call center 106 and provides system management. Any voice platform 110 known in the art may be utilized in an exemplary embodiment of the present invention (e.g., Tellme Studio from Tellme Networks, Inc. and Freespeech from HeyAnita, Inc.). In an exemplary embodiment of the present invention, speech recognition is provided by a purchased software package (e.g., Nuance Version 8.0 by Nuance Communications, Inc. and OpenSpeech Recognition from SpeechWorks International, Inc.). Similarly, text-to-speech capability may be provided by a purchased product (e.g., Speechify from SpeechWorks International, Inc.). The voice platform 110 also includes access to a contact database of potential customers as well as a telemarketing database with application information to relay to the potential customer depending on variables such as past buying habits and geographic location. The components of the voice platform 110 may be located at the same geographic location as depicted in FIG. 1 or they may be located in different geographic locations and communicate via the network 102.

For example, an embodiment of the present invention may be tailored to call all customers who have purchased treadmills from particular sport stores within a specified six-month time period. The contact database would include customer data (e.g., telephone number, name, and purchase information). The telemarketing application would include phrases such as "I hope you are enjoying the treadmill" and "I am calling today to tell you about a special offer on a weight machine." A language model would also store expected phrases (e.g., responses or messages) from the potential customer and a pointer to phrases in the telemarketing database that correspond to the potential customer responses, or messages. At the end of the telephone call, the contact database could be updated with information such as "never call again", "call again in three days", "send information about weight machine", or "call sent to call center."

The success of speech recognition depends on properly predicting what the called party will say. At least two approaches, known in the art, may be utilized to predict the set of responses expected from the potential customer. One approach is to use a deterministic directed language model that involves having a person, or a team of people, looking at the application and related data elements, predicting responses to all phrases and writing out all expected responses. These expected responses along with data in the telemarketing database are utilized to create a language model. Another approach is a statistical language model approach where responses made to the questions asked by a live telemarketer are collected from a large number of telemarketing calls and processed through a voice analysis tool to create a grammar model and related meanings. Any voice analysis tools (e.g., as provided by Nuance Communications or by SpeechWorks International, Inc for Call Routing) known in the art may be utilized with an embodiment of the present invention. This process of data collection and language model tuning may be performed on a periodic basis to keep the respective language models up-to-date. The language model is stored on a storage device located on the voice platform 110 or at the data center 108.

The telephones 104 depicted in FIG. 1 include conventional landline telephones and wireless mobile phones. The telephones are located in a variety of geographic locations (e.g., homes, cars, offices) and in communication with the voice platform 110 via the network 102. Also depicted in FIG. 1 is a call center 106 for sales or service. In an exemplary embodiment, the call center 106 houses telemarketers that are ready to talk to potential customers via telephone when a telephone call is routed to the call center 106 from the voice platform 110. FIG. 1 also includes a data center 108 in communication with the network 102. In an exemplary embodiment of the present invention, the data center 108 includes a storage device containing application databases and legacy computer systems that provide input to the telemarketing voice application located on the voice platform 110. For example, an event occurring in a computer system (e.g., a customer purchase is recorded) at the data center 108 may trigger a customer service related telephone call (e.g., a follow up call on sales satisfaction or a product survey) to be initiated by the voice platform 110.

In an exemplary embodiment of the present invention, a storage device is also included in the voice platform 110 to store the language model. The storage devices located at one or both of the voice platform 110 and the data center 108 may be implemented using a variety of devices for storing electronic information. It is understood that the storage devices may be implemented using memory contained in a host system located at the data center 108 or at the voice platform 110 or they may be separate physical devices. The storage devices are logically addressable as a consolidated data source across a distributed environment that includes a network 102. The physical data may be located in a variety of geographic locations depending on application and access requirements. Information stored in the storage devices may be retrieved and manipulated via the voice platform 110 or via a host system located at the data center 108. The storage devices include the telemarketing database and the contact database as well as the scripting and language models.

An alternate embodiment of an exemplary system for performing automated prepaid account renewal includes one or more multimodal devices in communication with the voice platform 110 via the network 102. Multimodal devices may be utilized to apply the most appropriate medium for the task at hand (e.g., voice, visual data). For example, for applications performed primarily by a user in motion, speech may be the best medium to use to communicate with the user. Alternatively, if a user requests a listing of all restaurants serving a particular type of food and in a particular city or location, a visual list of all restaurants fitting the category may be presented to the user. If the list only includes one or two restaurants, the list may be relayed verbally to the user. In addition, telemarketing calls may be received by a multimodal device with visual content that complements the voiced scripting. The visual content may include a visual display of options, features and/or packages for the product or service. hi another scenario, a visual reminder message is left pertaining to the renewal of services or products. A variety of multimodal scenarios may be implemented with an exemplary embodiment of the present invention and the scenarios will vary based on user requirements for particular applications.

An example of an application that may be performed utilizing an exemplary embodiment of the present invention is presented below. The example telemarketing voice application is an application to call potential voters (i.e., potential customers) to inform them about the stands on particular issues taken by candidates running for elected office. In addition, the application allows a potential voter to leave a message, or comment, for the candidates. An example dialog follows:

| | |
|---|---|
| Called Party: | Hello. (or Hi or Yes) |
| System: | Hello, how are you? |
| Called party: | Just Fine. (or Okay or "who is this?") |
| System: | I'm calling on behalf of "Vote America". Can I answer any questions you may have about the upcoming Bob Jones - Sally Smith House of Representatives election this August 20th? |
| Called Party: | Sure. |
| System: | I know their voting records and I can tell you where they stand on specific issues. I can speak to taxes, schools, national defense, water quality, the environment, medical benefits and the country's energy plans. Which topic is of interest? |
| Called Party: | I am interested in schools. |
| System: | Are you interested in the stand Bob Jones has taken, Sally Smith has taken, or both? |
| Called Party: | etc. |
| System: | <Later> Would you like to leave a comment for either candidate? |
| Called Party: | I would like to tell Bob Jones not to increase taxes. |
| System: | I will forward your message to Bob Jones. Do you have any other questions or comments for the candidates? |
| Called Party: | Yes. Take me off of your call list, but you can send me information through the mail. |
| System: | Okay, we will take you off of the call list and use the mail to keep you informed about the candidates in the future. Thank you. Goodbye. |

Figure 2:
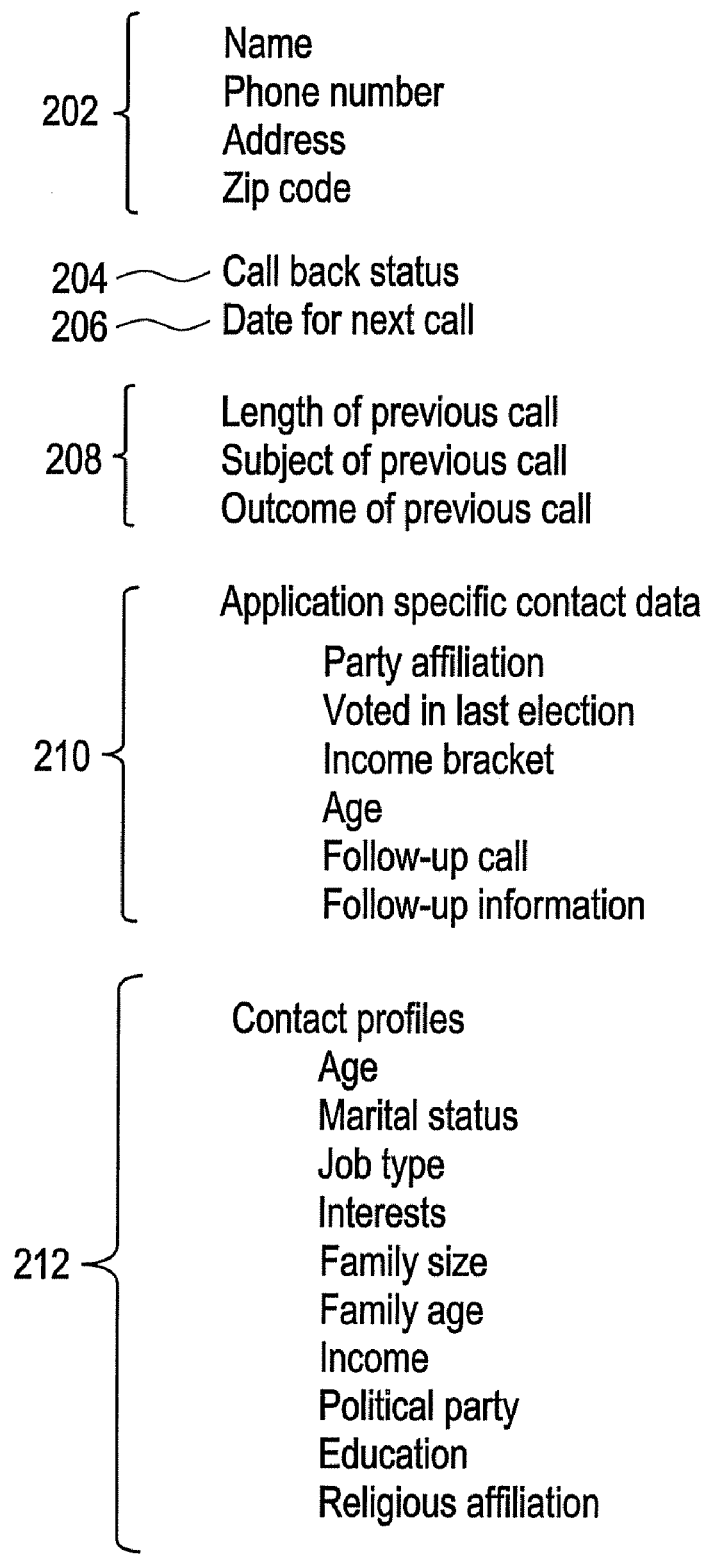
FIG. 2 is a database layout of an exemplary contact database utilized by an embodiment of the present invention, including both general and application specific data.

FIG. 2 is a database layout of an exemplary contact database utilized by an embodiment of the present invention to perform the example dialog shown above. The contact database may be located on a storage device at the voice platform 110 or at the data center 108. The contact database includes general contact attributes 202 and contact profiles 212. The general contact attributes 202 include name, phone number, address and zip code. The general contact attributes 202 and contact profiles 212 are utilized to determine which candidates and corresponding issues to discuss with the called party. The contact profiles attributes 212 include age, marital status, job type, interests, family size, family age, income, political party, education and religious affiliation. The general contact attributes 202 and contact profile attributes 212 may be utilized to collect non-application specific information about a potential client that may be useful in any application. The contact database also includes a call back status attribute 204 that is utilized to store information such as "don't call back" or "call back in a day." The date for next call attribute 206 stores a date (e.g., in mm/dd/yy format) for the next call to the potential voter. The previous call attributes 208 include length of previous call, subject of previous call and outcome of previous call. The previous call attributes 208 may also include records of earlier calls. This information may be utilized to determine the information and type of delivery for the next telephone call to the called party.

The telemarketing application specific contact data attributes 210 in the contact database include party affiliation, voted in last election, income bracket, age, follow-up call and follow-up information. The telemarketing application specific contact data attributes 210 along with the contact profiles 212 and the general contact attributes 202 may be utilized to determine the messages relayed to the called party by a particular application. For example, if the called party did not vote in the last election, the telemarketing application located on the voice platform 110 may be programmed to include a message about the importance of voting or may be programmed to offer the called party assistance in getting to a polling location for the next election. In addition, the application specific contact data attributes 210 may reflect information about a follow-up call or follow-up information in response to a request from the called party for either a follow-up call or follow-up information. The contact database will contain different attributes depending on the specific application being implemented by the voice platform. The contact database will provide information to the telemarketing voice application (e.g., phone number, zip code) and will receive information to store in the contact database from the telemarketing voice application (e.g., follow-up call, follow-up information).

FIG. 3 is a database layout of an exemplary telemarketing database utilized by an embodiment of the present invention to perform the example dialog shown above. The telemarketing database may be located on a storage device at the voice platform 110 or at the data center 108. The telemarketing database includes a zip code attribute 302. Depending on the zip code of the called party, information for a different combination of candidates, offices and election dates may be offered to the called party. In an alternate exemplary embodiment, other attribute values are stored and utilized to match a geographic area to a particular election (e.g., area code of telephone number, address). Referring to FIG. 3, each zip code attribute 302 may correspond to more than one candidate's attribute 304 and office attribute 306. The office attribute 306 for a particular zip code 302 is the key into the issue attributes 310. Each issue attribute 310 value includes one or more sentences describing the stand taken by the one, two, or more candidates running for the office contained in the corresponding office attribute 310. Example issues include: schools, taxes, national defense, medical benefits, energy policy and the environment. In addition, the telemarketing database depicted in FIG. 3 includes a comments attribute 312 to reflect comments for the candidates received from the called parties.

In an exemplary embodiment of the present invention, the telemarketing database is utilized along with the contact database in the voice application to carry on a conversation with the called party. The contact database is utilized to determine who to call and to tailor the message delivered. For example, the contact database depicted in FIG. 2 could be utilized to cause all registered republicans living in a particular zip code to be given one set of information, all registered democrats living in the particular zip code a second set of information, and all unregistered voters a third set of information. In addition, the contact database could break down the information delivered (e.g., the issues and candidate stands) based on income bracket and/or age. The telemarketing database includes the information to be delivered to the called parties. The voice application with its grammar or language model includes all expected responses from the called parties and pointers to the telemarketing database entries to perform the next action based on the responses or messages received from the called party. In an exemplary embodiment of the present invention, the next action may include sending the call to a call center, reciting a scripted answer from the telemarketing database, recording information received from the called party or ending the call.

Any application requiring a telephone call to be made to deliver information to a called party may be implemented by an exemplary embodiment of the present invention. For example, an embodiment of the present invention may be utilized to perform customer service operations. Telephone calls may be auto-dialed to perform functions such as reminding customers of a service appointment or requesting an appointment, and confirming a delivery date and time. Telemarketing "cold calls" may also be implemented using an exemplary embodiment of the present invention. The list of called parties may be determined based on data contained in a contact database.

Figure 4:
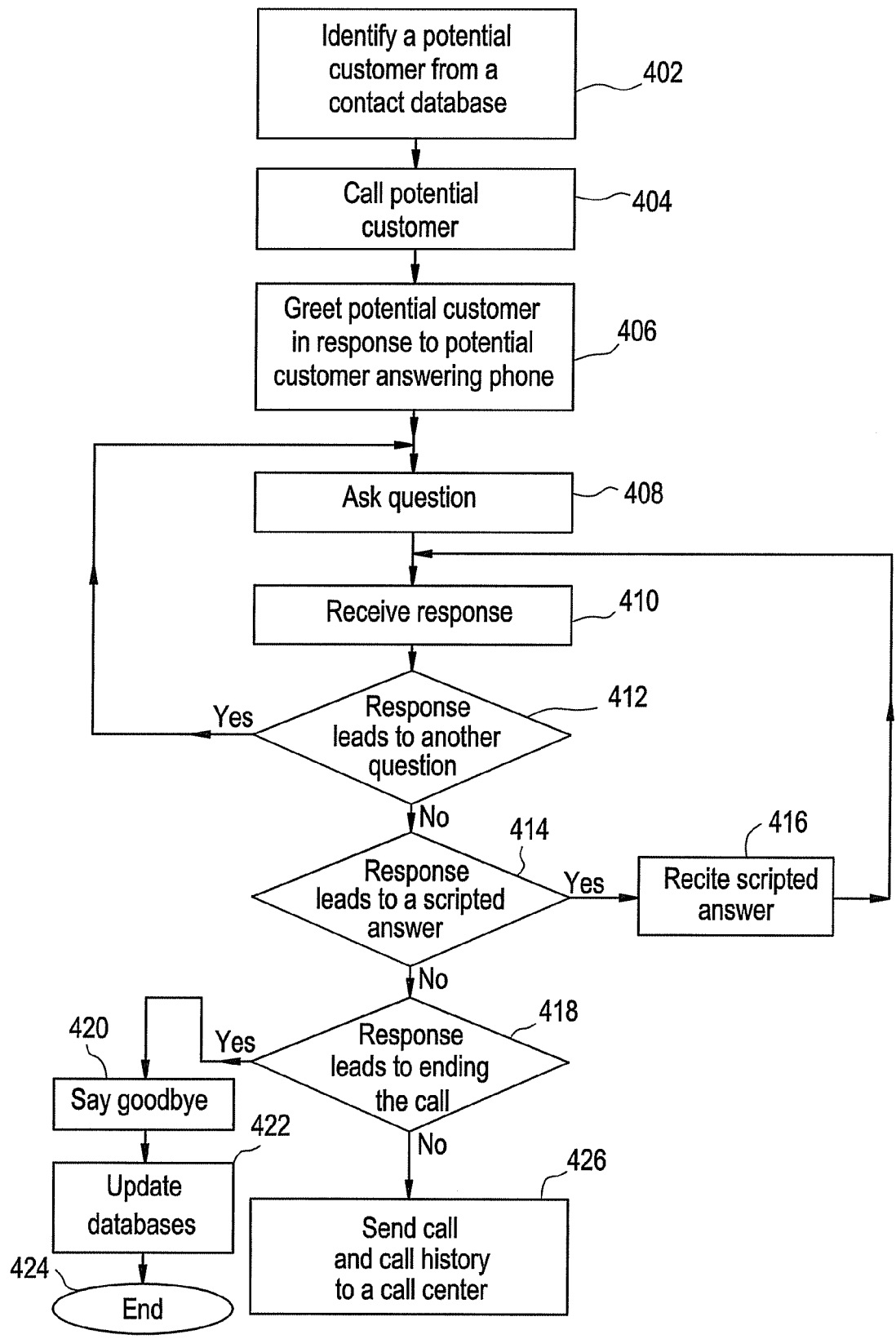
FIG. 4 is a block diagram of a process flow for an exemplary embodiment of the present invention.

FIG. 4 is a block diagram of a process flow for an exemplary embodiment of the present invention. At step 402, a potential customer is identified based on data contained in a contact database. At step 404, the potential customer is called using auto-dialing equipment located at the voice platform 110. The telemarketing voice application greets the potential customer at step 406 in response to the potential customer answering the telephone 104. The voice greeting to the potential customer is generated by a text-to-speech conversion device based on data contained in the contact database. In an exemplary embodiment of the present invention, the telemarketing voice application transmits a greeting within a pre-specified time period of receiving a notification that the customer has answered the telephone. If this pre-specified time period is relatively short (e.g., one second) customer hang-ups may be avoided. At step 408, the application asks the potential customer a question, or makes a statement to the potential customer using data contained in the telemarketing database and a text-to-speech conversion device. A response, or message, is received from the potential customer at step 410. The response is interpreted by a speech recognition device and compared to the list of expected responses listed in the language model. A determination is made at step 412 to see if the response leads to another question. This determination is made and the next question indicated by a telemarketing voice application, using data contained in the contact database, the language model and the telemarketing database as input. If the response does lead to another question, the question related to the telemarketing database as indicated by the telemarketing voice application is asked of the called party at step 408. If the response did not lead to another question, step 414 is performed to determine if the response leads to a scripted answer.

If the response does lead to a scripted answer, step 416 is performed. Again, the determination is made and the scripted response indicated by the telemarketing voice application, using data contained in the contact database, the language model and the telemarketing database as input. If the response does lead to a scripted answer then the scripted answer contained in the telemarketing database and indicated by the telemarketing voice application is read to the called party at step 416. If the response did not lead to a scripted answer, step 418 is performed to determine if the response leads to ending the call. The determination is made in a manner similar to the one described in reference to step 414. If the response does lead to ending the call, then the scripted response indicated by the telemarketing voice application is read to the potential customer at step 420 and then step 422 is performed.

At step 422 the databases are updated based on information exchanged during the call. For example, the contact database may be updated with a data value to indicate not to call this potential customer back or to indicate that this potential customer would like written materials to be sent. Alternatively, the telemarketing database may be updated to reflect comments were received from the potential customer. At step 424 the telemarketing voice application, for this particular telephone call ends. If the response did not lead to ending the call, as determined at step 418, step 426 is performed and the telephone call is sent to a call center 106. Being transferred to a call center 206 at step 426 may occur for a variety of reasons such as: the telemarketing voice application located on the voice platform 110 cannot understand the response, or message, received from the potential customer; the potential customer has requested to be transferred to a call center 206, and the telemarketing voice application has determined that the next step is to transfer the telephone call to the call center.

As described previously, an exemplary embodiment of the present invention includes a telemarketing voice application, located on a voice platform 110 for calling and greeting a called party, offering specific information, understanding the called party's interest and selection(s) and then delivering the requested information or executing follow-up action. Possible follow-up action may include additional information delivered then or later, setting a follow-up appointment for a sales call or service, or connecting the called party to a sales or service representative. The dialog between the voice enabled application and the called party may utilize structured prompts paired with appropriate grammars that understand the varied responses of the called party. In an exemplary embodiment of the present invention, call reports and call logs are stored on a database located on a storage device included in the voice platform 110 or the data center 108 to provide performance measurements. The call reports and call logs database may reflect call outcomes such as "don't call me again", or "connect me to customer service". These call logs and call reports may also be monitored by supervisors to help ensure quality. In addition, both recorded voice prompts for static scripting and synthesized voice (TTS) prompts for dynamic scripting may be employed by an exemplary embodiment of the present invention. Further, multiple language offerings are possible by adapting the scripting and grammars for each language.

An embodiment of the present invention may be utilized as a back-end to an existing telemarketing platform. The potential customer is called using the auto-dialing device. Once the telemarketing voice application has determined that a potential customer (i.e., not an answering machine) has answered the phone, it generates the greeting to the potential customer. While the telemarketing voice application on the voice platform 110 is greeting the potential customer, it is also transferring the telephone call to a telemarketer at the call center 106. In this manner, the potential customer will not hear silence on the line prior to the telemarketer getting on the line. This may lead to a reduced number of potential customers hanging up the telephone before the telemarketer can market the product or service.

An exemplary embodiment of the present invention may lead to supplementing or replacing sales or service personnel for performing 'call backs', generating telemarketing sales calls, delivering targeted information and securing confirmations or sales leads. This may lead to a lower cost per call and for a more consistent message to be sent to each potential customer. In addition, a conversational exchange between the automated system and the called party will "understand" if the called end is "live" or an answering machine. This allows for fewer answering machine calls and correspondingly, more "live" calls to be transferred to the call center 106 and thus may lead to higher productivity for sales and service personnel. Also, the ability to provide automated conversation, without the time gap signaling to the called party that the call is from a telemarketer, may lead to presenting the telemarketing content to more prospective customers.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for performing automated telemarketing, the method comprising:

receiving potential customer data including a telephone number;

initiating a telephone call to the telephone number using an auto-dialing technology;

receiving notification that the potential customer has answered the telephone call;

sending a verbal greeting to the potential customer in response to receiving the notification; and conversing with the potential customer, wherein the conversing includes:

accessing a series of questions and scripted answers from a telemarketing database; and reciting the series of questions and scripted answers selectively in response to a message received from the potential customer, wherein the message is interpreted by a speech recognition technology;

wherein the verbal greeting and the questions and scripted answers are tailored based upon the potential customer data, wherein the potential customer data further includes a name, an address, a zip code, and at least one of an age, a marital status, a job type, interests, a family size, a family age, an income, a political party, an education, and a religious affiliation.

2. The method of claim 1 further comprising:
transferring the telephone call to a call center.

3. The method of claim 2 wherein the transferring occurs when the message includes a request to be transferred to the call center.

4. The method of claim 1 wherein the speech recognition technology translates voice input data of the potential customer into text data and meaning.

5. The method of claim 4 wherein reciting the questions and scripted answers selectively includes:
  accessing a language model to correlate the text data with an entry in the telemarketing database, wherein the entry is one of the questions and scripted answers in a textual format;
  utilizing a text-to-speech technology to translate the entry into output voice data; and
  communicating the output voice data to the potential customer.

6. The method of claim 1 further comprising:
transmitting visual data to the potential customer.

7. The method of claim 1 wherein the conversing is multilingual, and a language is chosen based on the language spoken by the potential customer.

8. The method of claim 1 wherein sending the verbal greeting occurs within a pre-specified time period of receiving the notification.

9. The method of claim 1 further comprising:
transmitting telephone call data to a database in response to ending the telephone, wherein the telephone call data includes telephone call logging data, instructions about calling back the potential customer, and instructions about sending the potential customer follow-up information.

10. The method of claim 9 wherein the telephone call data further includes comments from the potential customer.

11. The method of claim 1 wherein the telephone call is one of a marketing call, a follow-up, and a reminder call.

12. The method of claim 1 further comprising:
selecting the potential customer data based on a zip code, wherein the potential customer data further includes the zip code.

13. The method of claim 1 wherein conversing with the potential customer is performed automatically, without a customer service representative, the telephone call terminating after the conversing is completed.

14. A computer program product for performing automated telemarketing, the computer program product comprising:
  a storage medium readable by a processing circuit and storing instructions for execution by the processing circuit for performing a method comprising:
    receiving potential customer data including a telephone number;
    initiating a telephone call to the telephone number using an auto-dialing technology;
    receiving notification that the potential customer has answered the telephone call;
    sending a verbal greeting to the potential customer in response to receiving the notification; and
    conversing with the potential customer, wherein the conversing includes:
      accessing a plurality of questions, scripted answers, and information from a telemarketing database; and
      outputting the questions, scripted answers, and information selectively in response to a message received from the potential customer, wherein the message is interpreted by a speech recognition technology;
      wherein the verbal greeting and the questions and scripted answers are tailored based upon the potential customer data, wherein the potential customer data further includes a name, an address, a zip code, and at least one of an age, a marital status, a job type, interests, a family size, a family age, an income, a political party, an education, and a religious affiliation.

15. The computer program product of claim 14 further comprising instructions for execution by the processing circuit for performing:
  transferring the telephone call to a call center, wherein the transferring occurs when the message includes a request to be transferred to the call center.

16. The computer program product of claim 14 wherein the speech recognition technology translates voice input data of the potential customer into text data and meaning, and the instructions for execution by the processing circuit further perform:
  accessing a language model to correlate the text data with an entry in the telemarketing database, wherein the entry is one of the questions, scripted answers, and information in a textual format;
  utilizing a text-to-speech technology to translate the entry into output voice data; and
  communicating the output voice data to the potential customer.

17. The computer program product of claim 14 wherein outputting the questions, scripted answers, and information selectively further comprises transmitting visual date to potential customer.

18. The computer program product of claim 14 wherein conversing with the potential customer is performed automatically, without a customer service representative, the telephone call terminating after the conversing is completed.

* * * * *